ELECTRIC WAVE FILTER SYNTHESIS

Filed Oct. 1, 1968 2 Sheets-Sheet 1

INVENTOR
D. A. SPAULDING
BY
J. P. Kearns
ATTORNEY 3,539,937
Patented Nov. 10, 1970

3,539,937

ELECTRIC WAVE FILTER SYNTHESIS

David A. Spaulding, Eatontown, N.J., assignor to Bell Telephone Laboratories, Incorporated, Murray Hill, N.J., a corporation of New York Filed Oct. 1, 1968, Ser. No. 764,184
Int. Cl. H03h *7/10;* H03f *1/00, 1/36*
U.S. Cl. 330—151 12 Claims

ABSTRACT OF THE DISCLOSURE

A distributed resistance-capacitance network with taps spaced along its length is made to approximate arbitrary rational transfer functions. A linear combination of tap voltages is added to the input signal to form a driving voltage for the network. A further linear combination of tap voltages forms the desired output signal. The ratios in which tap voltages are added to form the driving and output signals are determined by the respective poles and zeroes of the transfer function to be approximated.

BACKGROUND OF THE INVENTION

Field of the invention

This invention relates to the synthesis of electric wave filters by means of distributed resistance-capacitance networks and specifically by means of such networks with taps spaced along a longitudinal dimension.

Description of the prior art

Passive filters (containing no internal energy sources) using only resistive (R) and capacitive (C) elements are physically realizable and are attractive in theory for reasons of size, cost and reliability. Their practical use, however, has been limited because the network complexity of RC filters (due to restrictions on the kinds of transfer functions realizable with R's and C's only) is greater than that of RLC (containing inductive elements L in addition to R's and C's) filters realizing the same function. This defect can be overcome by using active elements in combination with passive RC components.

With the advent of miniaturization of electrical networks by thin-film techniques distributed RC transmission lines are being made available. These lines generally take the form of multilayer structures built upon substrates. Deposited on the substrate are successive conductive, dielectric and resistive layers. There exist, in addition, fabrication techniques for combining tantalum thin films with integrated semiconductor material so that monolithic structures containing both active and passive components are possible.

The promise of thin-film techniques for miniaturized filter synthesis has thus far been frustrated by the failure to realize the inductive (L) parameter passively. Consequently, attention has been focused on techniques for transforming with the aid of active elements the realizable capacitance (C) parameter into its inductive dual by such means as gyrators and negative impedance converters. The use of these latter elements with RC transmission lines, unfortunately, results in very complex structures as compared with conventional RLC networks synthesizing the same transfer function. Moreover, only transfer functions of special, nonrational form have been found to yield to these techniques.

Tapped RC transmission lines have been proposed for filter synthesis wherein selectively attenuated tap voltages are combined linearly to form the desired output. The attenuation factors required are determined by the zeroes of the transfer function to be realized. However, every rational transfer function involves a quotient of polynomials which implies the existence of poles as well as zeroes of transmission. Therefore, this procedure is not completely general.

SUMMARY OF THE INVENTION

It is an object of this invention to overcome the disadvantages of existing techniques for filter synthesis by means of distributed resistance-capacitance transmission line.

It is also an object of this invention to simplify both the method of synthesis and the structures for realizing arbitrary rational transfer functions by means of tapped distributed resistance-capacitance transmission lines.

It is another object of this invention to approximate to any desired degree of precision arbitrary rational transfer functions by the use of a single uniformly distributed, resistance-capacitance transmission line.

It is a further object of this invention to realize different transfer functions from a single resistance-capacitance transmission line structure without the necessity of changing the structure itself.

According to this invention, a single distributed resistance-capacitance (RC) transmission line is provided with taps spaced along its length. Each tap has a weighted feedback connection to the input of the line and a weighted feedforward connection to the output thereof. A first linear combination of tap voltages is thus added to the input signal to be filtered and furnishes the drying voltage to the line. A second linear combination of tap voltages then forms the desired output signal. The weighting coefficients by which the feedback tap voltages are multiplied are directly related to the poles of the transfer function being synthesized, while the weighting coefficients by which the feedforward tap voltages are multiplied are directly related to the zeroes of the same transfer function.

In an illustrative embodiment the RC transmission line is a three-layer structure including on a substrate a conductive layer, an insulating dielectric inner layer and a resistive upper layer. An input connection is made between one edge of the resistive layer and the conductive layer. A line intersecting this edge at right angles constitutes the longitudinal axis of the resistive layer. It is assumed that there is no substantial voltage variation transverse to this longitudinal axis. On this assumption, the RC line need not be straight, but can meander to conserve space. For the purposes of this invention, tapped connections are spaced along the longitudinal axis of the resistive layer. Weighting means or multipliers connected from such tap connections to the respective input and output terminals are simple resistors. Operational amplifiers with inverting and noninverting inputs combine the respective multiplier outputs in the proper relative polarities with the input signal to form the driving voltage at the input terminal and with the voltage at the output terminal to implement the desired transfer function.

Useful synthesis of second-order transfer functions (functions which conventionally require at least one inductor and one capacitor in an RLC synthesis) can be synthesized with only one tap intermediate of the input and output terminals.

Frequency scaling is made possible by merely changing the tap spacing. A fixed line with multiple taps facilitates such frequency scaling; for example, for the one-tap line, the input terminal may be moved farther from the open-circuited output terminal. Other features of the invention include the possibility of cascading several such networks, each one of which is tailored to a particular frequency range, by combining the output operational amplifier of one network with the input operational amplifier of the following one. The realization of higher order transfer functions is also possible in accordance with the principle of this invention and is dependent for practical implementation only on the stability of the parameters of available RC networks or transmission lines.

DESCRIPTION OF THE DRAWING

The above and other objects, features and advantages of this invention will be appreciated from a consideration of the following detailed description and the drawing in which.

DETAILED DESCRIPTION

Figure 1:
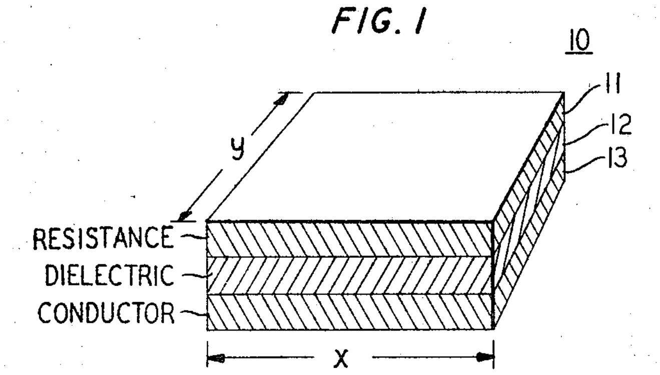
FIG. 1 is a perspective view of a section of a uniform distributed resistance-capacitance structure useful in the practice of this invention.

FIG. 1 shows in perspective view a section of a typical thin-film distributed, resistance-capacitance structure 10. Three layers are shown. The base layer 13 is of low resistance material, such as a relatively thick tantalum layer deposited on a strengthening glass or ceramic substrate (not shown). The sandwich or inner dielectric layer 12 is typically tantalum oxide ($Ta_2O_5$), which can be formed by anodizing some of the conductive layer to a thickness required to achieve the desired capacitance. The resistive layer 11, composed typically of tantalum nitride is further deposited on the dielectric layer. The resistivity is proportional to the thickness of and impurities in the resistive material. Other materials known to the art can, of course, be used. The $x$ dimension is the longitudinal dimension and the transverse $y$ dimension need only be sufficient to permit ohmic connections thereto for taps. The thickness and $y$ dimension basically determine the resistance per unit length along the longitudinal $x$ dimension. The dimensions in gross are assumed to be so small that inductive effects can be neglected.

Figure 2:
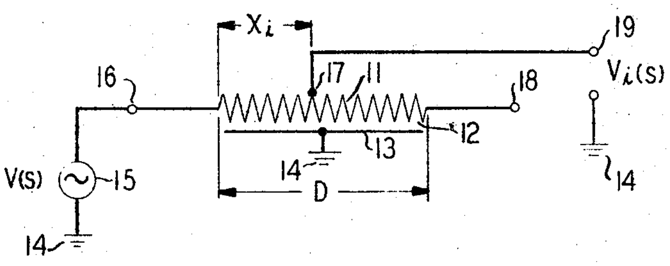
FIG. 2 is a schematic diagram of a uniform distributed resistance-capacitance network useful in explaining the principle of this invention.

FIG. 2 is a schematic representation of a distributed RC structure comprising a continuous conductive layer 13 with grounding terminal 14, a continuous resistive layer 11 of length D and uniform resistance per unit length, a dielectric layer represented schematically by the separation 12 between ground layer 13 and resistance 11, an input terminal 16, an output terminal 18 and a tap 17 connected to a further terminal 19 at an arbitrary distance $x_1$ from input terminal 16.

It has been shown, as developed for example in Integrated and Active Network Analysis and Synthesis by P. Chirlian (Prentice-Hall, Inc., Englewood Cliffs, N.J., 1967) on page 139 where the chain matrix for the untapped uniform distributed RC transmission line is given as Equation 4–85, that the open-circuit transfer function in the complex variable $s$ of an RC line of unit length is:

$$H(s)=\frac{1}{\cosh\sqrt{rcs}} \tag{1}$$

where $r$ and $c$ are respectively the resistance and capacitance in ohms and farads per meter of the uniform RC line.

Since an RC line of length D meters having a tap at an arbitrary location $x_1$ meters from its input terminal can be considered as a cascade of two separate RC lines having respective lengths of $x_1$ and $(D-x_1)$ meters, conventional manipulation of Chirlian's chain matrix yield the open-circuit voltage transfer function between the input terminal 16 with voltage source 15 applied thereto, as shown in FIG. 2, and a tap 17 at a distance $x_1$ meters from terminal 16. This transfer function is $$\frac{V_i(s)}{V(s)}=G_i(s)=\frac{\cosh (D-x_i)\sqrt{rcs}}{\cosh D\sqrt{rcs}} \tag{2}$$

Although the principles of this invention are completely general with respect to tap spacing, the analysis of the RC transmission line is greatly simplified if the taps are assumed to be equally spaced. On this assumption and if the distances D and $x_1$ are taken to be integral multiples of a fixed unit length $d$, i.e., $D=Ld$ (L is the total number of taps excluding the input connection) and $x_1=id$ ($i$ is the tap index number) and a new variable is defined as $\tau=rcd^2$, Equation 2 can be rewritten $$G_i(s)=\frac{\cosh (L-s)\sqrt{\tau s}}{\cosh L\sqrt{\tau s}} \tag{3}$$

Figure 3:
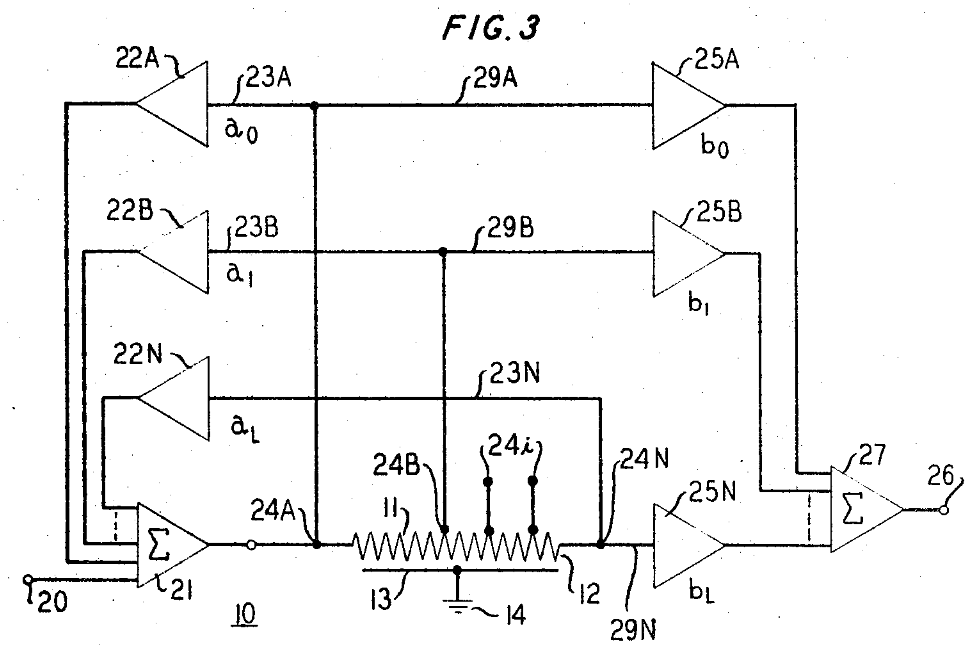
FIG. 3 is a generalized schematic diagram of a filter network realized according to the principles of this invention by the use of a uniform distributed resistance-capacitance structure.

Equation 3 is the voltage transfer function for a one intermediate tap uniform RC transmission line. Because such a line is linear in response, the transfer function for a multitap line, as is shown in FIG. 3, becomes $$G(s)=\frac{\sum_{i=0}^{L} b_i G_i(s)}{1-\sum_{i=0}^{L} a_i G_i(s)} \tag{4}$$

where $a_1$ and $b_1$ are real coefficients.

If a new coefficient $c_1$ is defined for the denominator, Equation 4 can be rewritten in more manageable form. Let $c_i=1-a_i$ for $i=0$ and $c_i=-a_i$ otherwise. Then Equation 4 becomes $$G(s)-K\frac{\sum_{i=0}^{L} b_i \cosh (L-i)\sqrt{\tau s}}{\sum_{i=0}^{L} c_i \cosh (L-i)\sqrt{\tau s}} \tag{5}$$

where K is a real constant such that $c_0=1$ (whence $a_0=0$) and $b_i=1$ for the smallest $i$ for which $b_i\neq 0$.

By conventional manipulation, Equation 5 can be factored into the form $$G(s)=K\frac{{}_2R-L\prod_{i=1}^{R} (\cosh\sqrt{\tau s}-Z_i)}{\prod_{i=1}^{L} (\cosh\sqrt{\tau s}-P_i)} \tag{6}$$

where $\pi$ represents continued multiplication, $Z_1$ and $P_1$ are dummy zeroes and poles which are real or occur in complex conjugate pairs and are related to the zeroes and poles of the transfer function to be synthesized as explained hereinafter; and R is a factor less than or equal to L determined by the largest value of $(L-i)$ appearing in Equation 5.

Since the hyperbolic cosine (cosh) terms appearing in the numerator and denominator of Equation 6 can be expressed in exponential form, i.e., $$2\cosh\sqrt{\tau s}=\exp(\sqrt{\tau s})+\exp(-\sqrt{\tau s}) \tag{7}$$

the substitution $$p=\exp(\sqrt{\tau s}) \tag{8}$$

simplifies determination of the poles (location of frequencies of infinite response magnitude or natural resonance) and zeroes (location of frequencies of zero transmission) of the transfer function that can be represented thereby. A typical denominator factor $(\cosh\sqrt{\tau s}-P_1)$ can be rewritten, using Equations 7 and 8 and setting the result equal to zero as follows:

$$2\cosh\sqrt{\tau s}-2P_i=\exp(\sqrt{\tau s})+\exp(-\sqrt{\tau s})-2P_i=p^1+p^{-1}-2P_i=0 \quad (9)$$

The roots of Equation 9, which is quadratic in form, are calculated to be $$p_i=P_i\pm\sqrt{P_i^2-1} \quad (10)$$

Only one of the roots in Equation 10 is significant, however, because either one transforms through Equation 8 back into the transfer-function $s$-plane at the same point. The solution of Equation 8 by way of Equation 10 shows the relation between the quantity $P_i$ in Equation 6 and points $s_i$ in the $s$-plane for which the response of the RC network is infinite, i.e., where its poles occur. Since the solution of Equation 8 involves the logarithmic function of a complex variable, there are an infinity of values of $s_i$ for every value of $P_i$. Without more a rational transfer function in $s$ could not be realized.

Taking the logarithm of each side of Equation 8 for a specific $p_i$ realizes $$ln\,|p_i|+j(2\pi n+\arg p_i)=\sqrt{\tau s_i} \quad (11)$$

where $n=0, \pm1, \pm2$, and so forth. Squaring both sides of Equation 11 yields $$\tau s_i=ln^2\,|p_i|-(\arg p_i+2\pi n)^2+2j\,ln|p_i|(\arg p_i+2\pi n) \quad (12)$$

where arg $p_i$ is the angle whose tangent is the ratio of the imaginary to the real part of $p_i$.

The term $s_i$ is complex and can be taken as comprising a real part $\sigma$ and an imaginary part $\omega_i$. Real part $\sigma_i$ is equivalent to the first two terms on the right of Equation 12 and imaginary part $\omega_i$ is the $j$-term. $\sigma_i$ can be found in terms of $\omega_i$ by eliminating the common term ($\arg p_i+2\pi n$). Thus $$\tau\sigma_i=ln^2\,|p_i|-\frac{\omega_i^2\tau^2}{4\,ln^2\,|p_i|} \quad (13)$$

Figure 4:
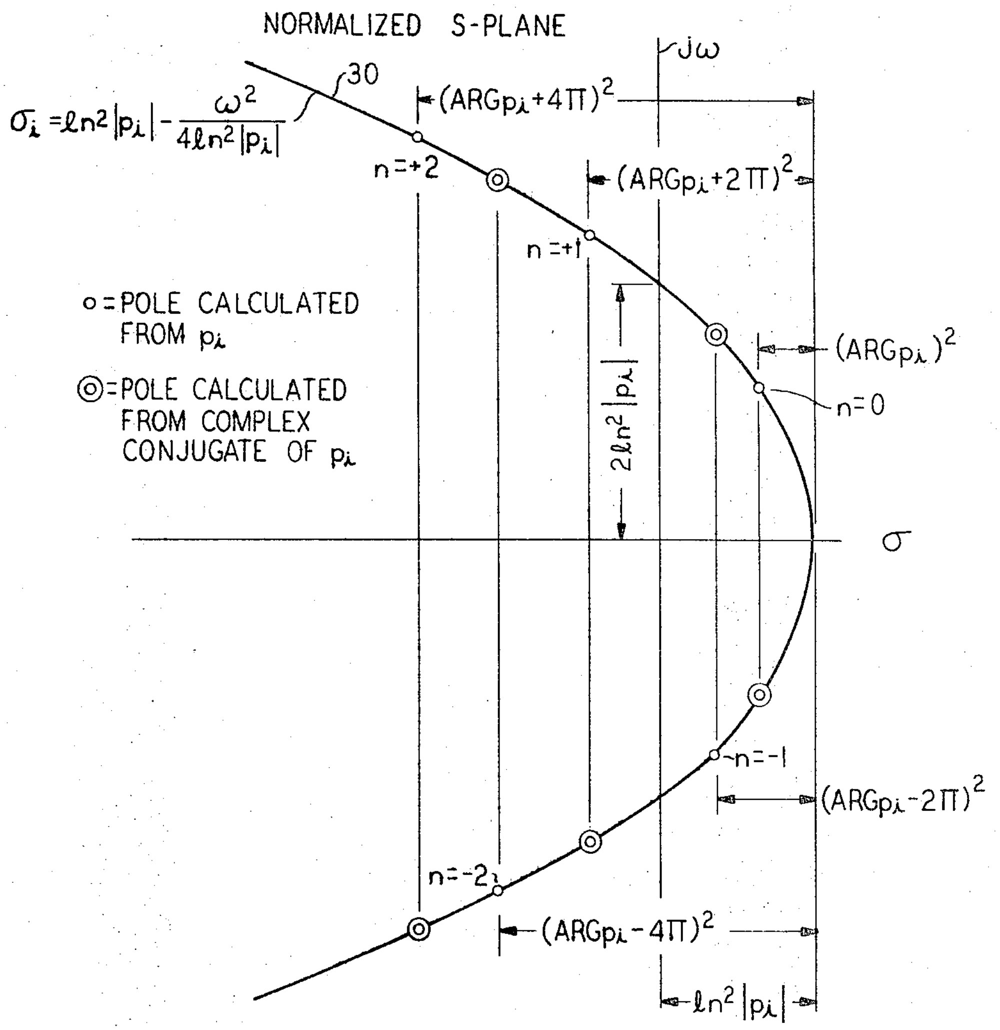
FIG. 4 is a normalized $s$-plane plot of possible roots of the denominator of the transfer function of a uniformly distributed, resistance-capacitance transmission line useful in the explanation of this invention.

Equation 13 defines a parabola 30 as shown in FIG. 4 on which the poles for an arbitrary complex value of $P_i$ as given in Equation 6 with $n=0, \pm1, \pm2$ are plotted. The value $\tau=rc$ is normalized at unity in the figure. The single circle locations occur when $P_i$ is substituted in Equations 10, 12 and 13.

The double circle locations occur when the complex conjugate of $P_i$, namely, $P_i^*$, is substituted in these same equations. The pole locations in FIG. 4, now occur in complex conjugate pairs, a necessary condition for physical realizability.

Equation 6 defines the response of a uniform RC transmission line as generalized in FIG. 2, and can approximate to any desired accuracy, a rational transfer function, such as that of a low-pass or a bandpass filter. The poles and zeroes of an arbitrary transfer function can be approximated in terms of Equation 6, if attention is restricted to those poles and zeroes which have a dominating effect. In fact, only the poles and zeroes plotted for $n=0$ in FIG. 4 need be considered. Since FIG. 4 is typical of a family of curves for different values of $\tau$, it is only necessary to choose $\tau=rc$ in such a manner as to bring the $n=0$ poles and zeroes closer to the $j\omega$-axis than those for other values of $n$. Then the poles and zeroes at $n=0$ dominate and the others may be ignored as a practical matter. It has been determined that the value of $\tau$ must be such as to maintain the real part $\sigma_i$ of $s_i$ in the left-half plane for stability. This necessarily implies that the magnitude of arg $p_i$ in Equation 12 will be greater than or at most equal to $ln|p_i|$.

The same analysis applies to the zeroes appearing in the numerator of Equation 6.

Equations 4 and 5 define a uniform RC transmission line with multiple taps as shown in FIG. 3, in which an RC line generally designated 10, including a ground plane 13, dielectric 12 and resistance 11, has thereon taps 24A through 24N. Tap 24A is the input to line 10 and tap 24N is the terminal tap. Each of taps 24A through 24N has a feedback connection by way of leads 23A through 23N and weighting networks 22A through 22N to a combining circuit 21. Combining circuit 21 also has an input from terminal 20, which is the external input of the overall network. Each tap 24A through 24N has a feedforward connection by way of leads 29A through 29N and weighting networks 25A through 25N to a further combining circuit 27, whose output at terminal 26 is the final output of the overall network. Ground plane 13 is grounded at connection 14.

Networks 22 and 25 are gain control devices such as, for example, resistors and may include emitter followers for isolation and impedance matching purposes. Combining circuits 21 and 27 are advantageously operational amplifiers.

The output of combining circuit 21 forms the driving-voltage summation indicated by the denominator of Equation 4 by linearly adding the input signal on terminal 20 to weighted contributions from each of taps 24 on the resistive portion 11 of RC line 10. These weighted contributions of the tap outputs are determined by the poles of the transfer function to be synthesized.

The output of combining circuit 27 in a similar fashion forms the output voltage summation indicated by the numerator of Equation 4 by linearly adding differently weighted contributions from each of taps 24 on RC line 10. These weighted contributions are determined by the zeroes of the transfer function to be synthesized.

The response of the RC network as defined in Equation 6 can be made to approximate that due to a single pole for values of frequency near that pole. A rational transfer function with a finite number of poles therefore can be approximated by making the dominant poles of the RC network match those of the desired transfer function. Dominant zeroes are handled in a similar fashion. To calculate the feedback and feedforward coefficients of Equation 5, it is only necessary to calculate the dummy $P_i$ and $Z_i$ of Equation 6 by using the desired poles and zeroes for the transfer function in the following linking equations derived from Equation 8; namely, $$Z_i=\cosh\sqrt{\tau\rho_i} \quad (14)$$

$$\text{and } P_i=\cosh\sqrt{\tau\lambda_i} \quad (15)$$

where $\rho_i$ and $\lambda_i$ are particular zeroes and poles of the desired transfer function.

The procedure or method for synthesizing a given rational transfer function according to my invention then involves the following steps:

(1) Select a value of $\tau=rc$ such that the poles of the given transfer function lie in a region where the resulting $n=0$ poles of the RC transmission line are dominant.

(2) Substitute the poles $\lambda_i$ of the desired transfer function into Equation 15 to determine values for the dummy poles $P_i$. These values of $P_i$ are in turn substituted in the denominator of Equation 6, which is then multiplied out and equated to the denominator of Equation 5 to determine the coefficients $c_i$. From the $c_i$ coefficients determine the weighting or multiplying feedback factors $a_i$ as previously specified.

(3) Substitute the zeroes $\rho_i$ of the desired transfer function into Equation 14 to determine values for the dummy zeroes $Z_i$. These values are in turn substituted in the numerator of Equation 6, which is multiplied out and equated to the numerator of Equation 5 to determine the coefficients $b_i$, which are the weighting or multiplying feedforward factors.

The selection of $\tau$ is essentially that of determining the spacing between taps. This spacing scales the response of the RC line to the frequency range of interest. For an RC line with evenly spaced taps high frequency operation is obtained by moving the tap used for the input terminal closer to the output terminal. Conversely, low frequency operation is obtained by moving the input and output terminals farther apart. In either case the terminal used for the output of the system must be the actual output terminal. From Equation 13 it is evident that the frequency scaling is inversely proportional to the square root of the tap spacing $d$. This means that if an RC line were constructed with a tap spacing of $d=\sqrt{\tau/rc}$ to synthesize a bandpass filter centered at 10 kHz, then to scale the center frequency to 5 kHz. at tap spacing of $d\sqrt{2}$ would be used without changing the multiplier coefficients.

For the case where $L=2$ in Equations 4, 5 and 6, syntheses of second order transfer functions can be approximated to any desired degree of accuracy. For $L=2$, taps are provided at locations 24A and 24N and at one intermediate position.

Equation 5 can accordingly be rewritten as follows:

$$F(s)=K\frac{b_0\cosh 2\sqrt{\tau s}+b_1\cosh\sqrt{\tau s}+b_2\cosh 0}{c_0\cosh 2\sqrt{\tau s}+c_1\cosh\sqrt{\tau s}+c_2\cosh 0}\quad(16)$$

The poles and zeroes of a realizable transfer function to be synthesized are complex and occur in complex conjugate pairs. $P_1=P$ and its complex conjugate $P_2=P^*$ as do $Z_1=Z$ and its complex conjugate $Z_2=Z^*$ (where * indicates the complex conjugate) from Equations 14 and 15. Accordingly, Equation 6 can be rewritten as follows:

$$G(s)=K\frac{2^0\cosh^2\sqrt{\tau s}-Z\cosh\sqrt{\tau s}-Z^*\cosh\sqrt{\tau s}+ZZ^*}{\cosh^2\sqrt{\tau s}-P\cosh\sqrt{\tau s}-P^*\cosh\sqrt{\tau s}+PP^*}\quad(17)$$

However, by a known identity $$\cosh^2\sqrt{\tau s}=\frac{1}{2}(\cosh 2\sqrt{\tau s}+1)\quad(18)$$

Substitution of Equation 18 into Equation 17, and noting further that $(Z+Z^*)=2ReZ$, $(P+P^*)=2ReP$, Equation 17 into the following form:

$$G(s)=K\frac{\cosh^2\sqrt{\tau s}-4ReZ\cosh\sqrt{\tau s}+1+2|Z|^2}{\cosh^2\sqrt{\tau s}-4ReP\cosh\sqrt{\tau s}+1+2|P|^2}\quad(19)$$

By equating the coefficients of the cosh terms in the numerators and denominators of Equations 16 and 19, the values of the $b_i$ and $c_i$ coefficients necessary for implementation of the RC transmission line can be found. Thus, from the denominators of Equations 16 and 19

$$c_0=1,\ c_1=-4ReP,\ c_2=1+2|P|^2\quad(20)$$

whence $$a_0=0,\ a_1=4ReP,\ a_2=-(1+2|P|^2)\quad(21)$$

Similarly, from the numerators of Equations 14 and 17, there are obtained $$b_0=1,\ b_1=-4ReZ,\ b_2=1+2|Z|^2\quad(22)$$

In the event that the transfer function involves zero transmission as complex frequency $s$ increases without limit and no other zero (suggesting a low-pass filter), the term $\cosh 2\sqrt{\tau s}$ dominates in the numerator of Equation 16 and since $c_0$ is arbitrarily taken as unity, G($s$) can vanish only if $b_0=0$. Also, $b_1=0$; otherwise, there would be zero other than at infinity. Thus, only $b_2$ is set to unity.

In the event that there exist zeroes of transmission as $s$ approaches both zero and infinity (suggesting a bandpass filter), the term $\cosh 2\sqrt{\tau s}$ again dominates for large values of $s$ and thus $b_0=0$. As $s$ approaches zero, the term $\cosh\sqrt{\tau s}$ approaches unity. Therefore, a zero of transmission can be made to occur only if $b_1=1$ and $b_2=-1$.

Two specific examples of practical syntheses can now be given.

A simple low-pass filter has the following transfer function $$G_1(s)=\frac{(s/4)^2+1}{s^2+\sqrt{2}\,s+1}\quad(23)$$

Equation 23 can be rewritten in factored form as $$G_1(s)=\frac{1}{16}\frac{(s+j4)(s-j4)}{(s+1/\sqrt{2}+j/\sqrt{2})(s+1/\sqrt{2}-j/\sqrt{2})}\quad(24)$$

Equation 24 indicates a transfer function having a pair of zeroes on the imaginary axis, indicating a zero of transmission at a frequency of 4 radians and a pair of complex conjugate poles in the left of the $s$-plane. From the zero in the $s$-plane at $j4$ the dummy zero is found from Equation 14 after normalizing $\tau$ at unity.

Thus, $$Z=\cosh\sqrt{j4}=\cosh(\sqrt{2}+j\sqrt{2})\quad(25)$$

By further mainpulation and the use of the identity $$\cosh(x+jy)=\cosh x\cos y+j\sinh x\sin y\quad(26)$$

Equation 25 becomes $$Z=0.342+j1.91=1.94\arg 79.88^\circ\quad(27)$$

From Equation 27

$$ReZ=0.342,\ |Z|^2=3.77\quad(28)$$

The results obtained in Equation 28 can be substituted in Equation 22 to yield tentative multiplying factors for the RC transmission line of FIG. 3; namely, $$b_0=1,\ b_1=-1.368,\ b_2=8.54\quad(29)$$

Further, in order to make the maximum response unity, a factor $K=0.0544$ [taking also into account the factor 1/16 in Equation 24] can be calculated from Equation 16. Thus, the final values of $b_i$ are $$b_0=0.0544,\ b_1=-0.0738,\ b_2=0.462\quad(30)$$

In a similar manner, the pole of Equation 24, $$\lambda=(-1\pm j)/\sqrt{2}$$

can be substituted in Equation 15 to obtain $$P=0.646+j0.313,\quad(31)$$

whence $$a_0=0,\ a_1=2.59,\ a_2=-2.03\quad(32)$$

Figure 5:
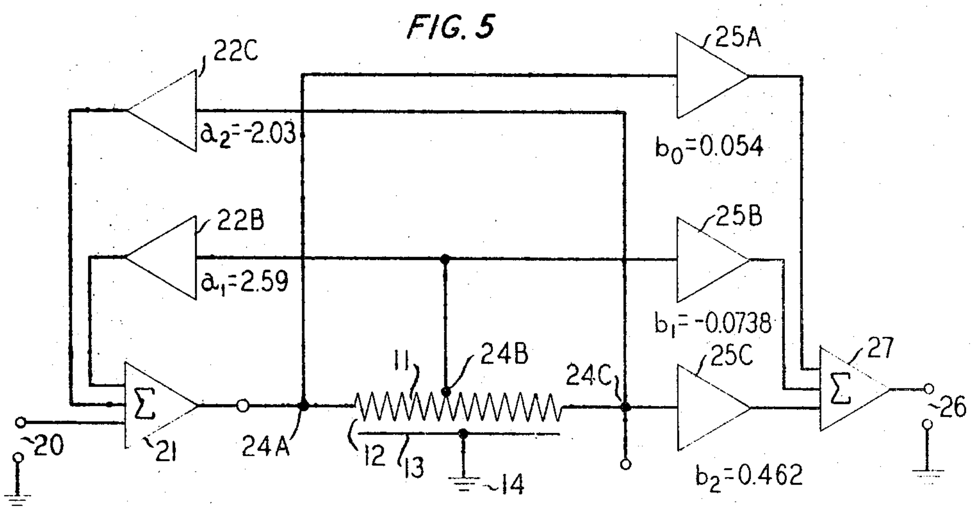
FIG. 5 is a schematic diagram of a uniform distributed resistance-capacitance transmission line with feedback and feedforward connections between an intermediate and two terminal taps thereon to synthesize, according to this invention, a low-pass filter.

The results of Equations 29 and 32 determine the appropriate multiplying factors in the RC transmission line synthesis of FIG. 3. The generalized RC line of FIG. 3 is redrawn in FIG. 5 to show the structure which implements Equation 19. Designators shown in FIG. 5 correspond to those in FIG. 3.

Another example can be made of the following bandpass transfer function $$G_2(s)=\frac{0.01\,s}{s^2+0.01\,s+1}\quad(33)$$

Equation 33 defines a bandpass filter centered about a normalized frequency of one radian per second. It has zeroes of transmission at zero and at infinity. Poles of the function are found at $0.005\pm j$, which are in the left-half of the $s$-plane very near the $j\omega$-axis. Thus, the Q of the filter is approximately 100. A value of $\tau=rc$ is selected as 4.94 in order to constrain the $a_1$ multiplying factor to be zero for circuit simplicity, i.e., $ReP=0$.

In Equation 15 the substitution $\lambda=-0.005+j\cong j$ is made. Thus, $$\sqrt{\tau\lambda}=\sqrt{\tau j}=\sqrt{\tau}\frac{1+j}{\sqrt{2}}\quad(34)$$

By the known identity of Equation 26 it can be seen that the real part (cosh $x$ cos $y$) is zero only if cos $y=0$, since the minimum value of cosh $x$ is unity. Accordingly, $y=\pi/2=\sqrt{\tau/2}$, whence $\tau=\pi^2/2=4.94$. From the imaginary part of the identity, Equation 15 is solved as $P=j2.34$.

Therefore, the feedback coefficients $a_i$ for the RC transmission line of FIG. 3 become, from Equations 21

$$a_0=a=0,\ a_2=-11.95 \qquad (35)$$

Since the transfer function of Equation 33 has zeroes at zero and infinity, the tentative feedback coefficients $b_1$ for the RC transmission line become $$b_0=0,\ b_1=1 \text{ and } b_2=-1 \qquad (36)$$

For normalization of the peak response the factor $K=0.051$ is found from Equation 16, this making the final values of $b_1$ equal $$b_0=0,\ b_1=0.051,\ b_2=-0.051 \qquad (37)$$

Although specific examples of second order transfer functions only are given above, higher order realizations are possible according to the principles of this invention. Practical problems relating to sensitivity to parameter changes, such as, tap spacing, feedback coefficients, and tap loading can be resolved principally by experimenting with the value of the unit $rc$ product $\tau$. Taps on the line may be isolated by the use of emitter followers in each multiplier when necessary. When individual RC lines are requqired to be cascaded, the number of operational amplifiers for combining purposes may be reduced by using a single such amplifier to combine the feedforward factors from a preceding network with the feedback factors from a succeeding network. Other embodiments of the invention within its spirit and scope will become obvious to those skilled in the art.

What is claimed is:

1. A transfer device for an input having component frequencies for approximating a desired rational transfer function comprising:
- frequency dispersive means for attenuating and distorting an input signal in dependence on its component frequencies,
- input means connected to said dispersive means,
- sensing means on said dispersive means and located at successive distances from said input means,
- first multiplier means obtaining scaled products of the signals appearing at each of said sensing means determined by the zeroes of said transfer function,
- second multiplier means obtaining other scaled products of the signals appearing at each of said sensing means determined by the poles of said transfer function,
- first summing means for combining the signals from each of said second multiplier means with an input signal at said input means, and
- second summing means for combining the signals from each of said first multiplier means to form the output of said device.

2. The said device of claim 1 in which said dispersive means is a distributed, resistance-capacitance transmission line.

3. The device of claim 1 in which said dispersive means is a uniformly distributed, resistance-capacitance transmission line.

4. The device of claim 1 in which each of said sensing means includes a tap connected at distances spaced along said dispersive means.

5. The device of claim 1 in which said sensing means are evenly spaced along said dispersive means.

6. The device of claim 5 in which frequency scaling of the transfer function to be approximated is inversely proportional to the square root of the tap spacing.

7. The device of claim 1 in which said dispersive means includes resistive material insulated from a conductive material to form a distributed capacitance.

8. The device of claim 1 in which said dispersive means comprises:
- a thin resistive film,
- a thin conductive film, and
- a thin insulation film separating said resistive film from said conductive film.

9. The device of claim 1 in which each of said multiplier means is independent of the other and includes substantially linear voltage proportioning means acting on signals at said sensing means.

10. The device of claim 1 in which the transfer function of said dispersive means is proportional to a first quotient $$\frac{\sum_{i=0}^{L} b_i \cosh\,(L-i)\sqrt{rcd^2s}}{\sum_{i=0}^{L} c_i \cosh\,(L-i)\sqrt{rcd^2s}}$$

where:
- $\Sigma$ indicates summation,
- $i$ is the index number of said sensing means commencing with zero at said input means,
- $b_i$ is the multiplying factor for successive ones of said first multiplier means,
- $c_i$ is the negative of the corresponding multiplying factor for said second multiplier means except that $c_0$ is normalized at unity,
- L is the total number of sensing means on said dispersive means excluding that at said input means,
- $d$ is the spacing between said sensing means along said dispersive means,
- $r$ is the resistance per unit length of said dispersive means,
- $c$ is the capacitance per unit length of said dispersive means, and
- $s$ is the complex frequency variable; and also to a second quotient $$\frac{\prod_{i=1}^{L} (\cosh\sqrt{rcd^2s}-Z_i)}{\prod_{i=1}^{L} (\cosh\sqrt{rcd^2s}-P_i)}$$

where:
- $\pi$ indicates continued multiplication,
- $Z_i$ are dummy transmission zeroes related to the transmission zeroes $\rho_i$ of a transfer function to be synthesized by the formula $Z_i=\cosh\sqrt{rcd^2\rho_i}$,
- $P_i$ are dummy poles related to the poles $\lambda_i$ of infinite response of a transfer function to be synthesized by the formula $P_i=\cosh\sqrt{rcd^2\lambda}$; said values $b_i$ and $c_i$ in said first quotient being obtained from the coefficients of respective $(\cosh\sqrt{rcd^2s})$ terms in said second quotient when the dummy pole and zero values corresponding to the function to be synthesized are substituted therein and the indicated summation and multiplication is carried out in the respective first and second quotients.

11. In combination with a distributed resistance-capacitance transmission line with uniformly spaced taps thereon and including a signal input and a signal output,
- means for approximating an arbitrary rational transfer function with known poles and zeroes in the complex frequency plane comprising
- first means combining at said signal input of said transmission line tap outputs selectively scaled according to the poles of said transfer function, and
- second means combining at said signal output of said transmission line tap outputs selectively scaled according to the zeroes of said transfer function.

12. The method of synthesizing an arbitrarily accurate approximation to an arbitrary transfer function from a uniformly distributed, resistance-capacitance transmission line with an input, an output and evenly spaced taps therealong comprising the steps of:

combining with the input of said transmission line outputs of said taps selectively multiplied by factors corresponding to the poles of infinite response of said transfer function to be synthesized, and simultaneously combining the outputs of said taps selectively multiplied by further factors corresponding to the zeroes of transmission of said transfer function to be synthesized.

References Cited

UNITED STATES PATENTS 3,204,180 8/1965 Bray et al.
3,315,171 4/1967 Becker.

HERMAN KARL SAALBACH, Primary Examiner
TIM VEZEAU, Assistant Examiner

U.S. Cl. X.R.

307—262, 295; 328—24, 61; 330—103; 333—29, 70